April 26, 1932. H. P. BRANDT 1,856,023
ENGINE TESTER
Filed July 1, 1929
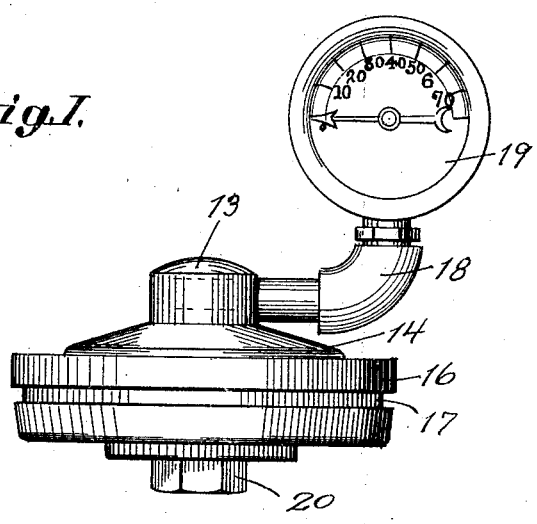
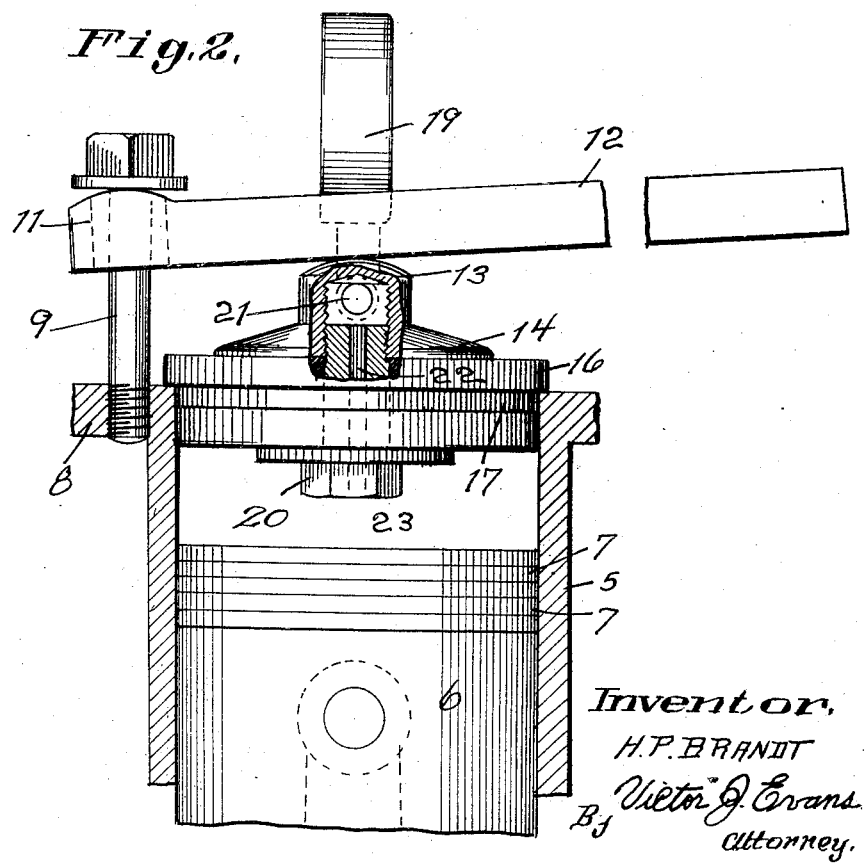
Inventor,
H. P. BRANDT
By Victor J. Evans
Attorney.

Patented Apr. 26, 1932

1,856,023

UNITED STATES PATENT OFFICE

HENRY P. BRANDT, OF SAN FRANCISCO, CALIFORNIA

ENGINE TESTER

Application filed July 1, 1929. Serial No. 375,304.

This invention relates to improvements in engine testers and has particular reference to a device for testing either the compression or vacuum created in the cylinder of an internal combustion engine.

The principal object is to produce a device which is simple in construction and one which may be readily applied to a cylinder or to a plurality of cylinders in succession.

A further object is to produce a device which does not require any alteration in the engine construction.

A still further object is to produce a device which may be readily transported and one which is economical to manufacture.

Other objects and advantages will be apparent during the course of the following description.

In the accompanying drawings forming a part of this specification and in which like numerals are employed to designate like parts throughout the same, Figure 1 is a side elevation of my device, and Figure 2 is a side elevation at right angles to Figure 1 and showing my device as the same would appear in use.

It is very essential in the proper functioning in an internal combustion engine that the compression in each cylinder should be the same for the reason that as the pressure differs the explosive force will fall in proportion to the variance in compression by the various cylinders. I have therefore produced a device which may be employed with the individual cylinder so as to check those cylinders to ascertain whether the pistons or piston rings are in proper condition.

In the accompanying drawings wherein for the purpose of illustration is shown a preferred embodiment of my invention, the numeral 5 designates the upper portion of a cylinder having a piston 6 positioned therein which is provided with the customary rings 7. The ordinary cylinder is provided with a flange 8 to which the cylinder head is attached. In the present instance the cylinder head has been removed and one of the retaining bolts 9 has been replaced. This is to permit the end 11 of a lever 12 to be engaged with the head thereof so that the lever may bear downwardly upon a hollow internally threaded boss 13 formed upon the upper portion of a rubber plug 14, which plug has a flange 16 slightly larger in diameter than the bore of the cylinder. This flange may be integral or separate as desired. The portion of the plug within the cylinder being tested is substantially the same diameter as the cylinder. A recess 17 is formed in the plug. At 18 I have shown a pipe extending from the boss 13 to a pressure gauge 19. The opening in the pipe 18 is shown at 21 in Figure 2 and has communication through a passage 22 formed in the bolt 20 which passes through the plug and is threaded into the boss 13 with a chamber 23.

The result of this construction is that when it is desired to test a cylinder for compression, the piston 6 is moved to the lower end of its stroke, the plug 14 is inserted above the piston and any sealing means such as oil or grease is employed in the groove 17 and between the top of the cylinder and the flange 16. By now causing the lever 12 to bear down upon the boss 13 the plug will be sealed to the top of the cylinder. By now rotating the crank so as to cause the piston 6 to move upwardly, the tester can tell by the feel whether the compression is good or not and by the use of the gauge may readily ascertain exactly the amount of pressure created. By watching the gauge it is also possible to ascertain whether the pressure is leaking.

If it is desired to test for vacuum the piston is moved to the top of the stroke of the plug inserted and as the piston moves downwardly the vacuum will suck the plug into the cylinder and seal the same thereagainst with the result that the lever 12 is not needed. If the gauge is of that type which will record both pressure and vacuum the same will indicate the vacuum within the piston in the same manner that the pressure was indicated.

It will thus be seen that I have produced a device which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In an engine tester of the character described, a bored plug having its diameter substantially that of the bore of the cylinder to be tested and having a peripheral groove formed therein, a flange formed on said plug adjacent said groove and adapted to engage the upper end surface of the cylinder to be tested, a hollow internally threaded boss secured on said plug, a pipe projecting from said boss, a gauge secured to said pipe, a bolt passing thru the bore of said plug and engaging the threaded portion of said boss, said bolt having a passage formed therethru for communicating pressure from the cylinder being tested thru said plug and said pipe to said gauge.

In testimony whereof I affix my signature.

HENRY P. BRANDT.